May 3, 1932.  W. A. MacDONALD  1,857,055
COUPLING SYSTEM
Filed Feb. 15, 1929  4 Sheets-Sheet 1

INVENTOR
William A. MacDonald
BY Pennie, Davis, Marvin
and Edmonds.
ATTORNEYS

INVENTOR
William A. MacDonald
BY
Pennie, Davis, Marvin and Edmonds.
ATTORNEYS

May 3, 1932.    W. A. MacDONALD    1,857,055
COUPLING SYSTEM
Filed Feb. 15, 1929    4 Sheets-Sheet 3

INVENTOR
William A. MacDonald
BY
Pennie, Davis, Marvin and Edmonds.
ATTORNEYS

INVENTOR
William A. MacDonald
BY
Pennie, Davis, Marvin and Edmonds.
ATTORNEYS

Patented May 3, 1932

1,857,055

UNITED STATES PATENT OFFICE

WILLIAM A. MacDONALD, OF LITTLE NECK, NEW YORK, ASSIGNOR TO HAZELTINE CORPORATION, OF JERSEY CITY, NEW JERSEY, A CORPORATION OF DELAWARE

COUPLING SYSTEM

Application filed February 15, 1929, Serial No. 340,244, and in Great Britain and Australia February 15, 1929.

This invention relates to radio coupling systems particularly to transformers for use in coupling two successive vacuum tubes in a radio-frequency amplifier, and also in coupling an antenna system to such an amplifier, intended for the efficient reception of two or more different frequency, or wavelength, bands.

To this end the invention employs coupling transformers having a multiplicity of windings so related to each other that the several primary coils operate as a single primary and the several secondary coils operate as a single secondary over one given frequency band, but that only certain of the primary and secondary coils operate as a single transformer over another given frequency band. A further feature of the invention is an improved frequency-amplification characteristic by reason of the provision of precalculated reactions between the various coils.

In the past, three expedients have been most commonly employed for the reception of two or more widely differing frequency, or wavelength, bands. The first, and most obvious, is the use of as many separate receivers or amplifiers as there are different bands to be received. The second consists in employing a separate transformer especially designed for each separate frequency band; the various transformers being provided with plug terminals which, when inserted in a suitable holder or receptacle, automatically establish the required electrical connections with the associated apparatus. The third expedient consists in permanently mounting as many physically separate transformers as there are different frequency bands to be received, and shifting the connections of the transformers with the associated apparatus from one transformer to another by means of an appropriate multi-point switching device.

The main objection to the first expedient is obviously that it is economically impracticable because of the attendant duplication of apparatus. The second and third expedients have, therefore, been proposed to obviate the main objection to the first.

The second-named arrangement is electrically sound, but is clumsy and undesirable from the point of view of operation, because a shift from one frequency band to another necessitates the opening of the receiver cabinet, the removal of one coil and the insertion of another. This operation is especially undesirable when the arrangement is employed in a multi-stage amplifier because in such event it is necessary to change a number of transformers, which operation entails a considerable delay in tuning. Furthermore, in this second arrangement, it frequently happens that the spare transformers, i. e., those not for the moment employed within the receiver, become damaged or lost. Finally, the construction and duplication of such "plug-in" transformers is necessarily expensive.

In the case of the third-mentioned expedient, the use of two or more entire sets of transformers within the receiver is objectionable because of the additional space required and because of the increased cost. Furthermore, all the switching devices for this apparatus thus far proposed are complicated, expensive, and subject to failure both electrically and mechanically. In the case of multi-stage amplifiers wherein large degrees of amplification are required, these complicated switching devices introduce both resistance and capacity losses which are detrimental to satisfactory operation of the amplifier; and in addition, the exposed high-potential portions of the switch and its associated connections introduce detrimental capacitive couplings which are difficult, if not impossible, to eliminate and which, in many cases, result in uncontrollable regeneration or oscillations.

The present invention contemplates not only the design of transformers of high efficiency whereby high amplification may be attained, but utilizes a more simple electrical and mechanical structure than has heretofore been employed in the reception of a plurality of frequency bands. An additional advantage of the invention results from the design of the transformers such that uniform, or substantially uniform, amplification is attained over one or more of the frequency bands, as desired. This invention overcomes all of the disadvantage of the prior arrangements, as pointed out, by providing a single transformer structure which may be permanently fitted in the receiver or amplifier, but which includes at least as many sets of windings as there are frequency bands to be received; the change from one frequency band to another being accomplished by short-circuiting or open-circuiting one or more of the unused coils in each transformer, such as the secondary coil for example, in which case the primary coils are always connected in circuit.

Before describing the invention with the aid of the accompanying drawings, it should be pointed out that this invention is not limited to use in tuned amplifier circuits but may be used with good success in untuned amplifiers. The invention is adapted to be used not only in combination with the common three-element tube, but also with the four-element tube, commonly known as the shield, or screen-grid, tube (the particular type of tube employed having no special relation to this invention); it may likewise be employed as a coupling device in amplifiers whether or not they include neutralization, and for coupling the amplifier to an antenna as well as for coupling one vacuum tube with another. By "neutralization" is meant the neutralization of the capacitive coupling between two elements or electrodes of a vacuum tube together with the associated wiring, whereby the tendency towards the production of oscillations is reduced or eliminated.

Referring to the drawings.

The arrangement of Fig. 6 is derived from Figs. 4 and 5 with grid-circuit neutralization substituted for the plate-circuit neutralization of those figures.

The circuit of Fig. 7 is a modification of Fig. 1 by which the amplification/frequency curve is made more nearly level.

Figure 1:
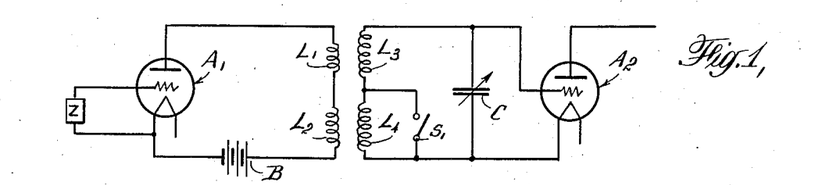
Fig. 1 shows a simple unneutralized radio-frequency amplifier circuit including an intertube coupling system arranged in accordance with this invention.

The circuit diagram of Fig. 1 represents a tuned radio-frequency amplifier including two vacuum tubes $A_1$ and $A_2$ coupled by means of a system in accordance with this invention, including a coupling transformer comprising two primary windings $L_1$ and $L_2$, and two secondary windings $L_3$ and $L_4$. In effect, these four windings constitute two transformers, the first transformer $L_1$, $L_3$ being wound to comparatively small inductance to cover a high-frequency band; and the second transformer $L_2$, $L_4$ being wound to comparatively high inductance to cover a low-frequency band, altho, as is hereinafter pointed out, the "two transformers" may be designed to react upon each other in a definite, precalculated manner. For the convenience of the present discussion, the high-frequency tuning band may be considered as that between 500 and 1500 kilocycles, and the low-frequency tuning band as that between 150 and 300 kilocycles, these two bands being those at present employed for radio broadcasting in England. This particular example, however, is given only as a specific illustration of one embodiment of the invention; for obviously, other frequency bands may as well be accommodated. For instance, the invention may be used to advantage in radio receivers adapted to respond to the two broadcasting bands at present in effect in the United States, i. e., the band between 500 and 1500 kilocycles and that between 5000 and 7500 kilocycles.

A single-pole switch $S_1$ is shunted across winding $L_4$ to act as a band-changing control. When used for the reception of the lower radio-frequency band, the switch $S_1$ is opened, whereby the primary inductances $L_1$ and $L_2$ are in series in the plate circuit of vacuum tube $A_1$, and the secondary windings $L_3$ and $L_4$ are in series in the input circuit of vacuum tube $A_2$. These two sets of windings then function like a single low radio-frequency transformer. Variable condenser C, connected to the extreme terminals of $L_3$ and $L_4$, then operates to tune the coupling system over this band. When it is desired to receive over the high-frequency band; the switch $S_1$ is closed, thus short-circuiting the low-frequency secondary $L_4$, but leaving in circuit the high-frequency secondary $L_3$ with the variable tuning condenser C connected across its extremities.

As is represented in the diagram, switch $S_1$ may be a simple single arm, single-contact switch, whose arm is always maintained at a fixed base potential. In all of the examples shown herein, this potential is that of the cathode or filament, usually known as "ground potential", and thus the switching device introduces practically no losses into the circuits.

The entire coupling system is so designed that the single variable condenser C, having the proper capacity range, is equally useful for tuning, alternatively, over the low-frequency, or long-wavelength, band and the high-frequency, or short-wavelength, band, and over still other bands, if necessary. Reference to the figure will disclose that in shifting from the low-frequency band to the high-frequency band, both primary windings $L_1$ and $L_2$ remain connected.

Figure 2:
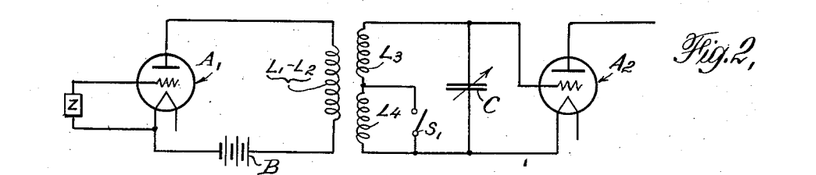
Fig. 2 illustrates a circuit similar to Fig. 1, but slightly modified.

When used for the reception of low frequencies, the two primary coils $L_1$ and $L_2$, may be considered as a single primary winding associated with the secondaries $L_3$ and $L_4$. (It is for this reason that Fig. 2 shows coils $L_1$, $L_2$ as a single winding.) When functioning as a high-frequency coupling system, the effective primary winding may be considered as only $L_1$, and the secondary as only $L_3$, because the electrical constants are chosen so that the primary $L_2$ has relatively small coupling with the secondary $L_3$. This condition is brought about by a proper selection of the constants of the various coils, both individually and with respect to each other, in the following manner: The high-frequency primary $L_1$ may comprise a relatively small inductance closely coupled to the high-frequency secondary $L_3$. The low-frequency primary $L_2$, connected in series with the high-frequency primary $L_1$, comprises a larger inductance than $L_1$, and is but loosely coupled to the high-frequency secondary $L_3$.

When it is desired to receive signals within the low-frequency band, the short-circuiting switch $S_1$ is opened; thereby causing the entire secondary winding to be coupled to the entire primary winding, in which event necessary transfer of energy from the primary to the secondary is secured in most part by the relatively close coupling between the low-frequency primary $L_2$ and the low-frequency secondary $L_4$. A slight increase in mutual inductance between the entire primary winding and the entire secondary winding is secured as a result of the coupling between the high-frequency primary $L_1$ and the entire secondary, but this is relatively small as compared with the mutual inductance between the low-frequency primary and secondary.

When it is desired to receive signals within the high-frequency band, the short-circuiting switch $S_1$ is closed, thereby short-circuiting the low-frequency secondary $L_4$. The transfer of energy from primary to secondary is then effected thru the combined couplings of $L_1$ and $L_2$ with the high-frequency secondary $L_3$. Obviously the major portion of the coupling for this band is between $L_1$ and $L_3$. The physical position of winding $L_2$ with respect to $L_3$ is so adjusted that the electrical effect produced by the low-frequency primary $L_2$ upon the high-frequency secondary $L_3$ is relatively small when the low-frequency secondary $L_4$ is short-circuited.

Much attention must be paid to the proper choice of the electrical constants of the various coils and to the physical, and consequential electrical, relationship of these coils. In some cases, for example, the two frequency bands here under discussion, it has been found desirable to design the primary coils so that their maximum inductances, when considered in conjunction with their distributed capacities and the capacities of the components (including the tuning condenser) and connecting wires connected to them, are resonant at frequencies higher than the highest frequency of the respective tuning bands of the amplifier. If the resonant frequency of the primary circuit comes within a tuning-frequency band, the result may be a material reduction in the amplification and a corresponding decrease in selectivity over a large part of that band.

The physical placement of certain of the coils produces other electrical effects which must also be considered in calculating the final performance of the complete transformer. For example, short-circuiting the low-frequency secondary coil $L_4$ has a pronounced effect upon the high-frequency secondary $L_3$, if these two coils are placed too close together. This effect varies with the dimensions and electrical characteristics of the respective windings, but in transformers such as herein described, the too close proximity of the short-circuited coil $L_4$ to coil $L_3$ results in a pronounced increase in resistance in the coil $L_3$; thereby decreasing the amplification and the selectivity within the high-frequency band.

In the circuit diagram of Fig. 1, as well as in those of the other figures, the input circuit of the first amplifying tube $A_1$ is represented as an impedance Z, usually a tuned input circuit or an untuned antenna circuit; and the source of plate potential is shown as a battery, B.

Figure 6:
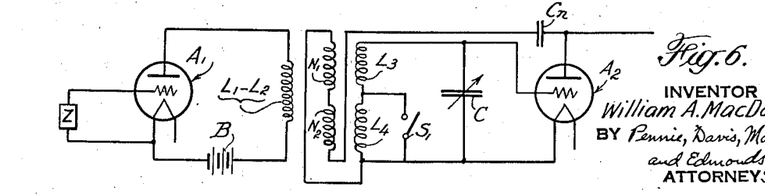

The systems shown in Figs. 1, 2 and 6 may be used to couple an antenna to an amplifier in which case the extreme terminals of $L_1$ and $L_2$ may be connected to the antenna and ground, respectively, instead of to the plate electrode and filament circuit of a vacuum tube, as illustrated.

In no case in the drawings herewith are the filament-heating circuits of the vacuum tubes shown completed for the reason that it is now well known in the art that the filament or cathode of a vacuum tube may be heated by any of several methods. Likewise, the plate, or output, circuit of the second vacuum tube $A_2$ in each figure is shown uncompleted; but it is to be understood that such plate circuit may be completed in the same manner as the plate circuit of the tube $A_1$—and so on, for as many amplification stages as may be desired, the last stage being coupled to a detector or some other appropriate device.

The arrangement of Fig. 2 is substantially the same as that of Fig. 1 with the exception that the separate primary coils $L_1$ and $L_2$ are here combined into a single winding $L_1$ $L_2$. With such an arrangement the best results are obtained by employing a relatively large primary winding; that is, its inductance should be of the same order of magnitude as the combined inductances of the primary windings $L_1$ and $L_2$ of Fig. 1, and so associated with the secondary windings $L_2$ and $L_3$ as to produce the required mutual inductances between coil $L_1$—$L_2$, and each coil $L_3$ and $L_4$. More specifically, the mutual inductance between $L_1$—$L_2$ and $L_3$, for the frequency bands assumed, should be considerably greater than the mutual inductance between $L_1$—$L_2$ and $L_4$.

Figure 3:
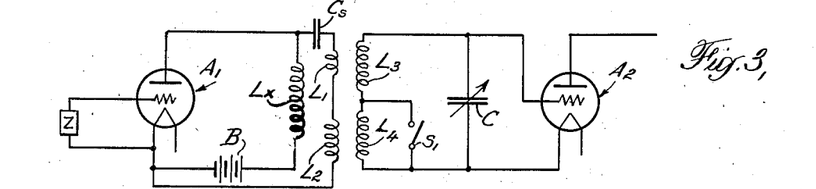
Fig. 3 is similar to the arrangement of Fig. 1 with the addition of a "parallel plate feed", whereby the plate current does not pass thru the primary winding of the coupling transformer.

Fig. 3 shows a modification of the arrangement of Figs. 1 and 2 in that the plate voltage for the amplifying tube $A_1$ is supplied thru a separate parallel feed including the high-frequency choke coil, (or alternatively, a resistance) $L_x$. A stopping condenser $C_s$ connected between the high-potential end of choke $L_x$ and the high-potential end of high-frequency primary winding $L_1$ serves at once to by-pass the radio-frequency current in the output circuit of tube $A_1$, around the direct-current path B, $L_x$ to the primary windings, and to insulate the plate potential from the primary windings of the transformer. Altho the Fig. 1 type of coupling transformer is here represented, the modified type shown in Fig. 2 could as well be employed.

Figure 4:
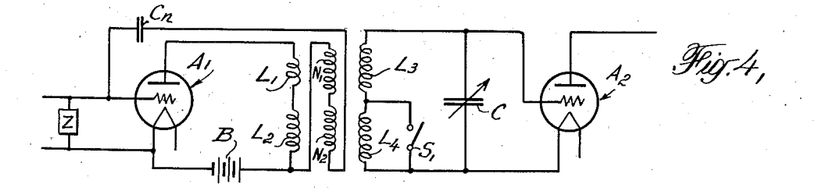
Fig. 4 is similar to Fig. 1 with the addition of plate-circuit neutralization, i. e., a third circuit is provided for neutralizing the grid-plate coupling capacity of the tube.

It is frequently desirable to add to a radio-frequency amplifier stage means for neutralizing the grid-plate capacitive coupling of the vacuum tube, whereby freedom from undesired regeneration and oscillations is attained. In Fig. 4, therefore, is shown a coupling arrangement similar to that of Fig. 1, but with the addition of a neutralizing circuit $C_n$, $N_2$, $N_1$, connected in series between the grid electrode and the filament, or cathode, system. Since in this specific neutralization system the neutralizing coils $N_1$ and $N_2$ are electromagnetically coupled to plate coils $L_1$ and $L_2$, the neutralizing condensed $C_n$ being connected to the grid of the vacuum tube, the neutralization is effected in the plate circuit. The principle of plate-circuit neutralization is explained in Hazeltine U. S. Patent No. 1,533,858, especially as illustrated in Fig. 2 thereof, which system has been slightly modified for application to the coupling system of the present invention. Accordingly, neutralizing coils $N_1$ and $N_2$, connected in series, have been added to the coupling system of Fig. 1; $N_1$ being closely coupled to high-frequency primary $L_1$; and neutralizing winding $N_2$ being closely coupled to low-frequency primary $L_2$. By properly proportioning the six different windings represented in the diagram, and by properly positioning them with respect to each other, it is thus possible to obtain entirely satisfactory neutralization over both frequency bands.

Figure 5:
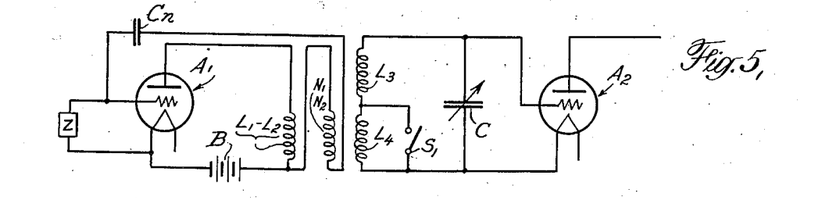
Fig. 5 is similar to the modified form of Fig. 2, but with the addition of plate-circuit neutralization.

Fig. 5 is a further development of plate-circuit neutralization as applied to the modified coupling system of Fig. 2; the explanation given above in connection with that figure being applicable to Fig. 5 with equal effect. It will be noted that in this arrangement, the neutralizing coils $N_1$, $N_2$ have been combined into a single winding in the same manner that the primary coils $L_1$, $L_2$ have been combined.

Fig. 6 shows the present invention in the form illustrated in Fig. 2 as employed with an alternate form of neutralization, known as "grid-circuit neutralization". This form is also described in the mentioned Hazeltine patent, especially in connection with Fig. 3 thereof. It will be observed that in this form of neutralization the reciprocal form of neutralizing circuit is employed wherein the neutralizing condenser $C_n$ is connected in series with neutralizing coils $N_2$ and $N_1$ between the plate electrode of vacuum tube $A_2$ and the filament system. The neutralization has been shown as applied to the second tube $A_2$, rather than to the first tube as in the two preceding figures. Obviously such neutralization could be applied as easily to any or all tubes of a multistage amplifier. Because of the fact that in grid-circuit neutralization the neutralizing coil is electromagnetically coupled to the tuned coil in the grid circuit, the resulting effects differ somewhat from those observed in the case of plate-circuit neutralization. For example, assume that the switch $S_1$ has been opened in order to operate within the low-frequency band. Let L' equal the total effective secondary inductance of $L_3$ and $L_4$; and let M' equal the total effective mutual inductance between both secondary windings $L_3$ and $L_4$ and both neutralizing windings $N_1$ and $N_2$. Correspondingly, for high-frequency reception, the low-frequency portion of the secondary, $L_4$, is short-circuited by switch $S_1$ which results in a slightly less effective secondary inductance than that of $L_3$ alone, and a slightly higher effective mutual inductance with the neutralizing windings $N_1$ and $N_2$ than with $N_1$ alone. Now, with the switch closed and $L_4$ short-circuited, let L'' equal the total effective inductance of the secondary windings $L_3$, $L_4$; and let M'' equal the total effective mutual inductance between both secondary windings and both neutralizing windings. To achieve satisfactory neutralization within both the low and high-frequency bands, with no change in the value of the neutralizing condenser, the physical position of the secondary and neutralizing windings should be such that the following relation obtains:

$$\frac{L'}{M'} = \frac{L''}{M''},$$

in which case the neutralizing capacity is $$C_n = \frac{L'}{M'} \cdot C_{gp} = \frac{L''}{M''} \cdot C_{gp};$$

where $C_{gp}$ is the capacity existing between the grid and plate terminals.

Figure 7:
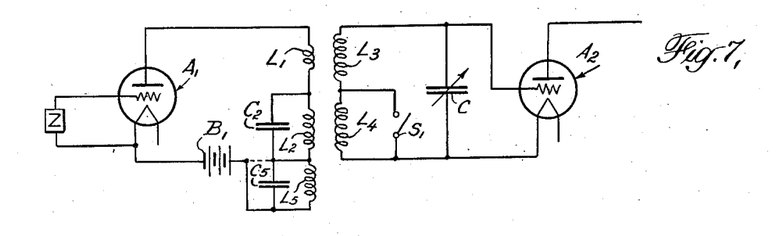

Fig. 7 illustrates further modifications of Fig. 1 by which the low-frequency primary winding $L_2$ is purposely loaded either by means of the distributed capacity of the winding itself, or by a physical condenser connected to the winding so that the whole may be resonant at a pre-selected frequency between the two tuning-frequency bands. (For the present discussion we may assume that the dotted connection above condenser $C_5$ connects the plate battery, B, to the lower terminal of inductance $L_2$, i. e., that the additional resonant circuit $C_5$, $L_5$ is not connected.) The purpose of this modification is to provide a nearly level amplification/frequency curve over the high-frequency tuning band. This result is accomplished by arranging the separate coils of the entire transformer structure so that the low-frequency primary winding $L_2$ has a definite coupling with high-frequency secondary coil $L_3$. Since the coil $L_2$ has more turns than the coil $L_1$, the former may have considerable electromagnetic coupling with the secondary coil $L_3$ even though it is not as close to $L_3$ as is coil $L_1$. The inductance of $L_2$ being much larger than that of $L_1$, the coil $L_2$, when considered in conjunction with its distributed capacity and any effective supplemental capacity $C_2$, should be resonant at a frequency between the maximum frequency of the low-frequency band and the minimum frequency of the high-frequency band, such as 450 kilocycles. Accordingly, the circuit condition is that coil $L_2$ in parallel with capacity $C_2$ is inductive over the lower frequency band and is capacitive over the higher frequency band. Then the desired coupling conditions will be that the coupling between $L_1$ and $L_3$ predominates at the higher frequencies of the high-frequency band; and the coupling between $L_2$ and $L_3$ predominates at the lower frequencies of the high-frequency band. It is to be understood, of course, that the secondary coil $L_4$ is presumed to be short-circuited when the above-defined conditions obtain.

Figure 7A:
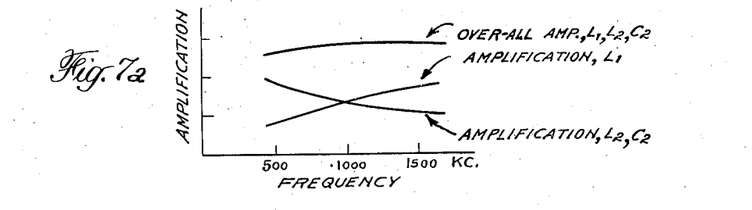
Fig. 7a illustrates approximately the amplification frequency curve obtained from the arrangement of Fig. 7.

The graphical representation of the manner in which these relations vary is given in Fig. 7a which shows the amplification/frequency curves with only coil $L_1$ in the primary circuit; with only $L_2$ and $C_2$; and with both coils functioning together in the improved manner. The upper curve, which is practically a horizontal line between 500 and 1500 kilocycles (i. e., the high-frequency band) indicates that nearly constant over-all amplication is attained.

The above description of the operation of the circuit of Fig. 7 is concerned only with the high-frequency band, because, as is well known, the undesirable characteristics of amplifiers and coupling systems are usually more pronounced at the higher frequencies. If, however, it is desired that the low-frequency band shall also have a substantially level over-all amplification, the same principles may be applied. To illustrate: the primary coil $L_5$ and its associated condenser $C_5$ have been added to the figure, and for the present discussion may be considered to be together connected in the plate circuit of the amplifying tube $A_1$, which is the primary circuit of the coupling system. To accomplish this connection the dotted line above condenser $C_5$ in the figure may be considered removed. For operation over the low-frequency band the switch $S_1$ is opened. The inductance of coil $L_5$ is made much greater than that of $L_2$; and the capacity $C_5$ of such value that the circuit $C_5$, $L_5$ is resonant at a frequency lower than 150 kilocycles, such as 100 kilocycles. The coil $L_5$ is then so placed relative to coil $L_4$ that the coupling between $L_5$ and $L_4$ predominates at the lower frequencies of the low-frequency band; whereas the coupling between $L_2$ and $L_4$ predominates at the higher frequencies of the low-frequency band. Altho Fig. 7a is shown to represent only the high-frequency band, it can as well be considered to represent the amplification over the low-frequency band as just described, since the typical amplication/frequency characteristics of the two bands will be practically identical if designed in accordance with the foregoing description. It is to be understood that if more than two frequency bands are included, additional circuits corresponding to $C_5$, $L_5$ may be connected in order that the additional frequency bands may likewise present uniform amplification characteristics.

Coupling arrangements such as those shown in Figs. 1, 2, 3 and 7 are especially useful when employed to couple tubes of the four-element or shielded-grid type. In such event, the circuit constants require certain modification depending upon the internal impedance of the tubes employed. A further improvement in the amplification characteristics of any of the circuit arrangements herein discussed may be had by including the parallel-feed feature which is shown in Fig. 3. This result, which may approach the "over-all" characteristics of Fig. 7a, will be achieved when the inductance and distributed capacity of the impedance $L_x$ of Fig. 3 and the capacity of the coupling, or stopping, condenser $C_s$ are properly proportioned, all of which is more fully explained in Trube co-pending U. S. application Serial No. 120,045, filed July 2, 1926. The provision of this parallel-feed circuit for the direct plate-current eliminates many insulation problems which otherwise would complicate the design of the coupling transformer by removing direct plate-current and potential from the coupling transformers. The possibility of electrical breakdown is thus eliminated, and the designer is enabled to choose the insulation merely for the purpose of spacing, which, as already pointed out, is of considerable importance in the present invention.

Figure 8:
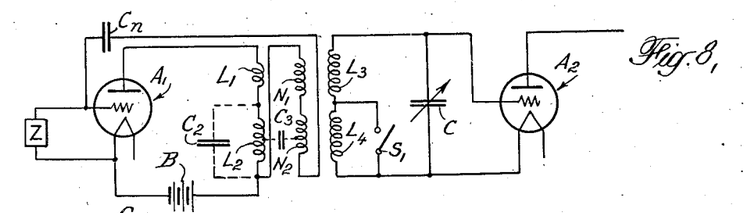
Fig. 8 combines the advantages of Figs. 4 and 7.

Fig. 8 is fundamentally a duplication of Fig. 7, but with the addition of plate-circuit neutralization of the grid-plate capacity of tube $A_1$. In this case, however, circuit $C_5$, $L_5$ of Fig. 7 is omitted, and the physical condenser $C_2$ of Fig. 7 is replaced by the natural capacity resulting especially from the presence of the additional neutralizing windings $N_1$, $N_2$. It has already been explained that in tuned radio-frequency amplifiers it is desirable, if not usually essential, that the grid-plate capacity of the amplifying tubes be neutralized to assure stability. In the past, however, addition of the necessary neutralizing winding has frequently introduced additional distributed capacities in the coupling transformer which in themselves have been detrimental. However, the interstage coupling transformers, as provided in the modification of Fig. 8, are so designed that the additional capacity introduced by the neutralizing winding is used to good advantage in that such capacity replaces the added capacity $C_2$ of Fig. 7 and thereby improves the amplification characteristic of the amplifier in the manner described in connection with Fig. 7. The dotted-line capacity $C_2$ of Fig. 8 comprises not only the actual distributed capacity of the windings $L_1$, $L_2$ as increased by the proximity of the neutralizing windings $N_1$, $N_2$, but also such additional capacities as those introduced by connecting leads, and by the inherent plate-filament capacity of the vacuum tube, together with the capacity of its socket. The capacity indicated in dotted lines by reference character $C_3$ as the effective resultant of the distributed capacity between the primary winding $L_1$, $L_2$ and the neutralizing winding $N_1$, $N_2$ supplements $C_2$, and is mostly introduced between primary winding $L_2$ and neutralizing winding $N_2$. It is especially advantageous to improve the amplification characteristic of the high-frequency band because within that band the amplification naturally falls off rapidly with decrease of frequency.

Figure 9:
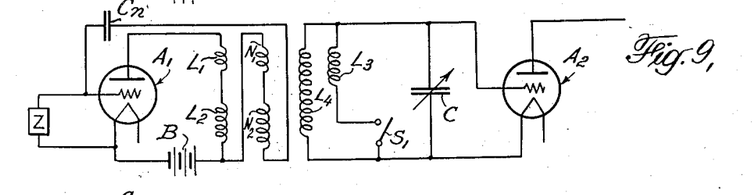
Fig. 9 is similar to Fig. 4, but includes an alternative means for shifting from one frequency band to another.

Fig. 9 shows a modification of the circuit arrangement of Fig. 4 in which, when operation is desired within the high-frequency band, the switch $S_1$ is closed, connecting the coil $L_3$ in parallel with $L_4$, thereby reducing the inductance of the secondary system. This arrangement necessitates that the coil $L_4$ have more inductance than in the arrangement of Fig. 4, since that coil must provide all of the required inductance when operating within the low-frequency band. Coil $L_3$ may, or may not, be coupled to $L_4$, and hence its polarity with respect to $L_4$ may, or may not, respectively, be opposite.

Figure 10:
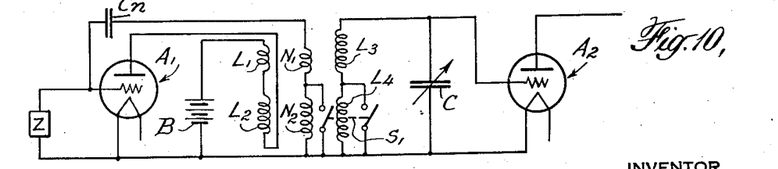
Fig. 10 is a modification of Fig. 8, and embodies a double switching arrangement.

The circuit of Fig. 10 is similar to that of Fig. 4 except that coils $N_1$ and $N_2$ are interchanged in the neutralizing circuit, and further that the switch $S_1$ short-circuits the neutralizing winding $N_2$ and secondary winding $L_4$ simultaneously. The effect of the short-circuiting switch is thus more complete than in the preceding figures where only the low-frequency secondary coil has been shown to be short-circuited. The object is, of course, to short-circuit the primary $L_2$, the neutralizing winding $N_2$ and the secondary $S_1$. It is, however, electrically undesirable to short-circuit coil $L_2$ because neither end of it is at ground potential. Practically the same effect is attained in the present circuit by short-circuiting the neutralizing coil $N_2$ which is closely coupled to $L_2$; and thus it is possible not only to attain the desired effect of short-circuiting $L_2$ and $N_2$; but in addition, switch $S_1$ can be mechanically and electrically simple because the switch arm is at ground potential. This modification can advantageously be incorporated in any of the circuits where neutralizing coils are employed, such, for example, as those of Figs. 12 and 13.

Figure 11:
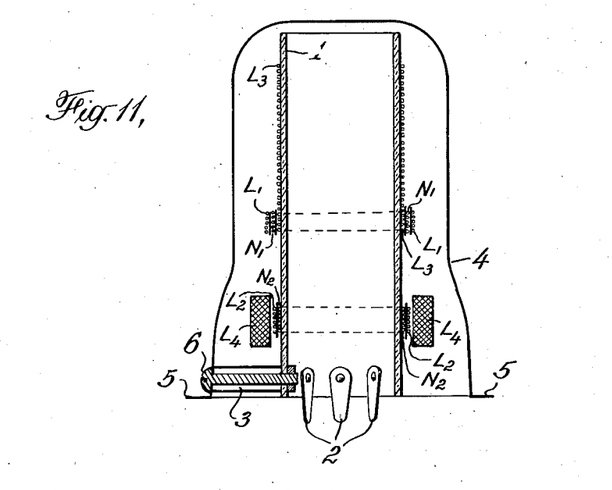
Fig. 11 is a cross-sectional view of a coupling transformer arranged in accordance with this invention.

A successful physical embodiment of a coupling transformer structure designed in accordance with this invention is illustrated in Fig. 11 which is a cross-sectional view. Reference to the figure will disclose that the device includes an insulating tube 1 upon which are wound and supported the various windings already described. The tube 1 has an outside diameter of 1¼ inches and a length of 3½ inches. In this structure, the high-frequency secondary winding $L_3$ is wound in a single layer over the upper portion of the insulating tube, while the comparatively fewer turns of the high-frequency neutralizing winding $N_1$ are placed in a single layer immediately on top of the low-potential end of the secondary winding; the high-frequency primary winding $L_1$ being wound in a single layer immediately over the neutralizing winding, the layers being separated by insulation such as celluloid of about .01 inch thickness. These three windings thus comprise a complete high-frequency transformer. The low-frequency transformer is wound upon and supported by the same insulating tube 1 on the lower portion thereof. It also comprises three windings, but here the neutralizing winding $N_2$ is wound in a single layer on the insulating tube, the primary winding $L_2$ being wound on and immediately over the neutralizing winding, the low-frequency secondary winding $L_4$ of the multi-layer type being placed over the primary winding $L_2$, an insulating layer being placed between the windings, as before. The spacing between the high-frequency transformer and the low-frequency transformer, along the axis of the insulating tube 1, should be such that the two transformers have a negligible magnetic influence upon each other. The exact spacing required depends largely upon the frequency bands for which the different transformers are designed, and also upon the degree of amplification per stage and upon the over-all amplification of the complete amplifier. In general, this spacing must be about ¼ inch. In the structure illustrated, the low-frequency primary and neutralizing coils $L_2$, $N_2$ are spaced ¼ inch from the high-frequency secondary $L_3$, and the low-frequency secondary $L_4$ is spaced 3/8 inch from the high-frequency secondary $L_3$.

Under some circumstances, such as when it is inconvenient to provide the required spacing due to other space limitations in the apparatus, or when the chosen frequency bands require it, it is necessary to electromagnetically shield or screen the separate transformers one from the other by means of a metallic shield, individual to each transformer, and electrically connected to the external shield or "can" 4 which is preferably placed so as completely to surround the entire structure, except in some instances at the bottom. As illustrated in Fig. 11, this "can" may be so shaped that it is spaced about the same distance from the windings of both transformers; i. e., the contour of the can may follow in general the average contour of the transformer windings, altho the electrical effect does not change much if the diameter of the can is constant. The transformer structure may be secured to the can with suitably positioned machine screws or rivets 6, and spaced therefrom by spacers 3. If required, similar screws and spacers may likewise be provided at the upper end of the transformer, altho these are not shown in the drawings. To connect the various windings of the transformer permanently in their respective circuits, terminal lugs 2 may be provided around the inside of the insulating tube 1; three of such terminals being shown in the figure. In order that the entire transformer structure, including the can, may be rigidly secured to a supporting panel, or the like, a flange or a series of feet, indicated in the drawings by reference character 5, is included. If more than two frequency or wavelength bands are required, additional windings (see Fig. 7) similar to those already illustrated and described may be provided, in which event the insulating tube 11 would be slightly longer than shown.

Figure 12:
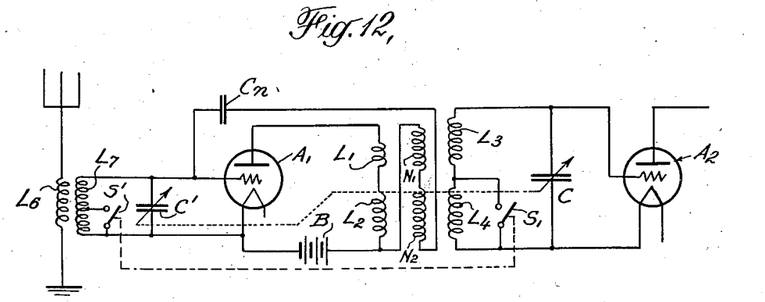
Fig. 12 shows a radio-frequency amplifier, similar to that of Fig. 4, coupled by a special system to an antenna system.
Figure 13:
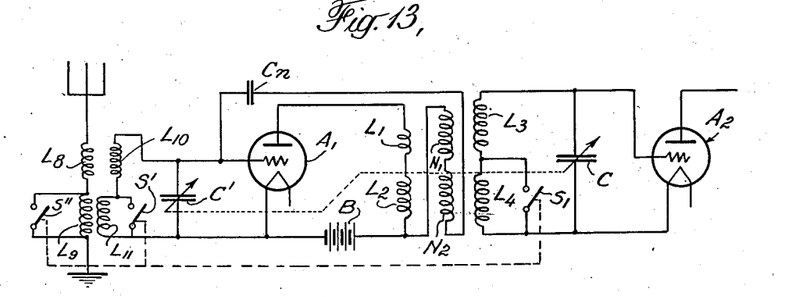
Fig. 13 is similar to Fig. 12 except that the antenna coupling system corresponds more closely to the intertube coupling system hereinbefore described.

The particular transformer structure illustrated in Fig. 11, and described herein, merely as a single typical embodiment of the present invention, was designed for use in a circuit of the type illustrated in Figs. 4, 12 and 13 and was eminently successful in a coupling system tunable over the two frequency bands already mentioned. The transformers had the following dimensions when employed with a vacuum tube having a grid-plate capacity of 4.5 $\mu\mu f$. and mutual conductance of 1000 milli-mhos:

Coupling transformers
   Self-inductance

|  | $mh.$ |
|---|---|
| $L_1$, $L_2$ (with $L_4$ short-circuited) | 58 |
| $N_1$, $N_2$ (with $L_4$ short-circuited) | 58 |
| $L_1$, $L_2$ (with $L_4$ not short-circuited) | 70 |
| $N_1$, $N_2$ (with $L_4$ not short-circuited) | 70 |
| $L_3$ (with $L_4$ short-circuited) | 233 |
| $L_3$, $L_4$ (with $L_4$ not short-circuited) | 3580 |

Mutual inductance

| | |
|---|---|
| $L_1$, $L_3$ (with $L_4$ short-circuited) | 21.5 |
| $L_1$, $L_2$ and $L_3$, $L_4$ (with $L_4$ not short-circuited) | 212 |

Coefficient of coupling
   $L_1$, $L_2$ and $N_1$, $N_2$—90% (approximately)

*Dimensions*

All coils, except low-frequency secondary $L_4$, wound with No. 38 (American gauge) enamelled copper wire: $L_3$, 132 turns; $N_1$, 12 turns; $L_1$, 12 turns; $N_2$, 30 turns; $L_2$, 30 turns; $L_4$, 321 turns of double silk-covered high-frequency cable of 20 strands of No. 38 (American gauge) enamelled copper wire.

Tuning condenser, C (or C')
   Minimum capacity__ 15 μμf. (approximately)
   Maximum capacity__ 400 μμf. (approximately)

Neutralizing condenser capacity
   $C_n$ __________ 4.5 μμf. (approximately)

Figure 11A:
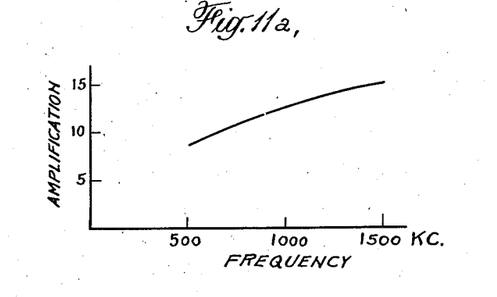
Fig. 11a and Fig. 11b show the amplification/frequency curves of the transformer of Fig. 11 over two different frequency bands.
Figure 11B:
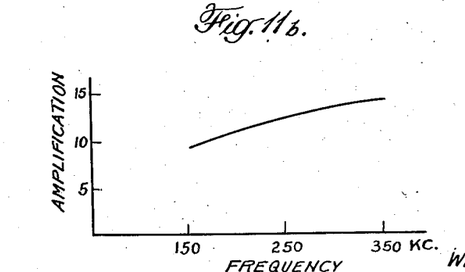

Fig. 11a and Fig. 11b show the approximate amplification characteristics of the high-frequency transformer and the low-frequency transformer, respectively, of the structure illustrated in Fig. 11.

In certain cases, it may be desirable partially to eliminate the effect of the low-frequency primary $L_2$ on the high-frequency secondary $L_3$ when amplifying signals within the high-frequency band. Fig. 10 shows how this may be accomplished by the use of an additional single-contact switch arranged to short-circuit the low-frequency neutralizing winding $N_2$ simultaneously with the short-circuiting of low-frequency secondary $L_4$. Both operations may readily be accomplished with any well constructed double-arm switch.

The circuit arrangement of Fig. 12, insofar as the coupling system between tubes $A_1$ and $A_2$ is concerned, is similar to that of Fig. 4. Here, however, an antenna system is coupled to the first radio-frequency amplifying tube $A_1$ (as in a radio receiver) by a coupling system fundamentally based upon the antenna coupling system described in my copending U. S. application Serial No. 280,464, filed May 25, 1928. This antenna coupling system is designed with comparatively loose coupling between primary $L_6$ and secondary $L_7$ so that a change in antenna capacity shall have but negligible effect upon the first tuned input circuit, thus making uni-control of the several tuning condensers possible, and additionally with the provision of an antenna coupling system amplification curve whose slope is substantially the reverse of that of the inter-tube coupling system curve. To this end the antenna inductance $L_6$ should be of such value that with the usual antenna capacity the reactance will always be inductive over the high-frequency band. In the present instance, the coil $L_6$ might have an inductance of 500 microhenries, and with the usual antenna capacity be resonant at about 400 kilocycles. The secondary coil $L_7$ may, in general, have characteristics similar to those of secondary coil $L_3$—$L_4$ of the inter-stage coupling system. The switch S' is similar in its function to switch $S_1$ already described in connection with Fig. 1, both switches being intended to be operated simultaneously. The use of this system in a fixed antenna circuit followed by an amplifier covering two different frequency bands is especially advantageous because the antenna circuit can be made resonant at a frequency between the two bands, but not included in either band, whereby the amplification is maintained at a consistently high level in both bands. The operation of this circuit is further discussed in connection with Fig. 14.

Figure 14:
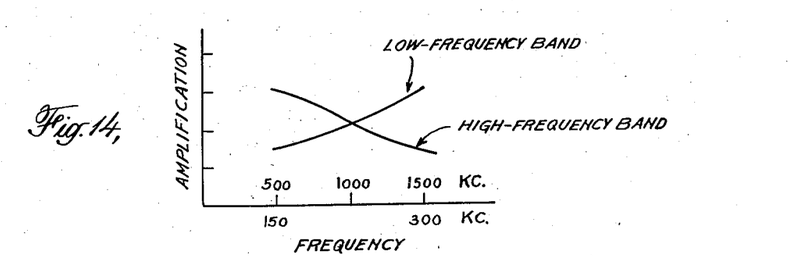
Fig. 14 illustrates the approximate frequency characteristics of the antenna system of Figs. 12 and 13 over the particular two frequency bands considered.

The circuit arrangement of Fig. 13 is similar to that of Fig. 12 insofar as the inter-tube coupling system is concerned, but differs therefrom in its antenna coupling system. Here the antenna coupling system is more nearly symmetrical with that of the intertube coupling system. Differing from the antenna circuit of Fig. 12, the present antenna circuit is designed so as to have a capacitive reactance thruout the entire operating frequency range including both bands. The secondary inductances $L_{10}$ and $L_{11}$ are normally identical with secondary inductances $L_3$ and $L_4$. The primary inductances $L_8$ and $L_9$ may be identical with primary inductances $L_1$ and $L_2$, but this depends upon the antenna employed. The arrangement, thus, does not result in the characteristics of the antenna coupling system of Fig. 12, but introduces in general the characteristics of the Fig. 12 arrangement over the low-frequency band. In other words, the low-frequency-band curve of Fig. 14 is a fair representation of the curves of both bands of the antenna coupling system of Fig. 13. If for any reason this characteristic is not desired, the final or over-all characteristic may be altered by combining the corrective measures previously described in connection with Figs. 3, 7 and 8. In Fig. 13 a short-circuiting switch S'' for the low-frequency primary $L_9$ is included because the impedance of this coil may be too high in the high-frequency band to be effectively short-circuited by closing the secondary switch S'. It should be noted that the switching arrangement provided in the circuits of Figs. 12 and 13 may be made structurally simple and electrically efficient, as in Fig. 10, because all of the switch arms are at ground potential.

The curves of Fig. 14 illustrate specifically the approximate amplification/frequency characteristics of the antenna coupling system of Fig. 12. Since the antenna circuit is resonant at a frequency between 300 and 500 kilocycles, the highest points on the two amplification curves correspond to these two operating frequencies nearest the resonant frequency of the antenna circuit. The two amplification curves are lowest at 150 and 1500 kilocycles, the two operating frequencies farthest removed from the resonant frequency of the antenna circuit, but the amplification is still sufficiently great at all frequencies within the two operating bands. This last result is best accomplished by the antenna circuit of Fig. 12.

I claim:

1. In a radio receiver adapted to operate over a high-frequency band and over a low-frequency band, a plurality of substantially identical tunable circuits including inductance coupled together in succession, a single band-changing control interconnecting a plurality of switches each having a single contact and an arm maintained always at a fixed base potential, one switch only being connected in each circuit and adapted to modify said inductance, and uni-control means for simultaneously tuning said circuits.

2. In a radio receiver, a tuned multistage radio-frequency amplifier adapted to operate over a high-frequency band and over a low-frequency band, each stage including inductance, a single band-changing control interconnecting a plurality of switches each having a single contact and an arm maintained always at a fixed base potential, one switch only being connected in each stage and adapted to modify said inductance, and uni-control means for simultaneously tuning said stages.

3. A radio receiver including a multistage tuned radio-frequency vacuum tube amplifier adapted to operate over a high-frequency band and over a low-frequency band, each stage including a plurality of sets of inductances said bands being separated by an intermediate-frequency band, a single band-changing control interconnecting a plurality of single-contact switches, one switch only being connected in each stage and adapted to modify one of said sets of inductances, and uni-control means for simultaneously tuning said stages.

4. A radio-frequency coupling system adapted to operate over a plurality of widely different frequency bands, said system including a plurality of secondary windings coupled to at least one primary winding, and a single-contact switch connected to one of said secondary windings whereby the closure of said switch effects a substantial change in the inductance both of the secondary winding to which said switch is connected and of the primary winding coupled thereto, said switch being the only short-circuiting switch in said stage.

5. A radio-frequency coupling system adapted to operate over a plurality of widely different frequency bands, said system including a plurality of secondary windings coupled to at least one primary winding, and a single-contact switch connected across one of said secondary windings but all of said primary windings remaining in circuit whereby the closure of said switch effects a substantial decrease in the inductance both of the secondary winding across which said switch is connected and of the primary winding coupled thereto.

6. A radio-frequency coupling system adapted to operate over a high-frequency band and over a low-frequency band, said bands being separated by an intermediate-frequency band, said system including a transformer having two series-connected secondary windings coupled to at least one primary winding, and a single-contact switch the closure of which materially changes the inductance of one of said secondary windings and of the primary winding coupled thereto.

7. A radio-frequency coupling system adapted to operate over a high-frequency band and over a low-frequency band, said bands being separated by an intermediate-frequency band, said system including a transformer having a plurality of secondary windings coupled to a plurality of primary windings, and a single-pole single-contact switch connected across one of said secondary windings to short-circuit the inductance of the secondary winding across which it is connected and thereby materially decrease the effective inductance of the primary winding coupled thereto.

8. A tuned radio-frequency coupling system connected between successive vacuum tubes in a radio-frequency amplifier adapted to operate over a high-frequency band and over a low-frequency band, said bands being separated by an intermediate-frequency band, said system including at least one primary winding connected in the output circuit of the first of said tubes, a high-frequency secondary winding and a low-frequency secondary winding connected in series in the input circuit of a second of said tubes, a variable condenser connected across said pair of secondary windings, the low-frequency secondary winding being coupled to at least one primary winding, and a switch connected across only said low-frequency secondary winding to short-circuit the inductance thereof and thereby to materially reduce the effective inductance of the primary winding coupled to said low-frequency secondary winding.

9. A tuned radio-frequency coupling system connected between successive vacuum tubes in a radio-frequency amplifier adapted to operate over a high-frequency band and over a low-frequency band, said bands being separated by an intermediate-frequency band, said system including a low-frequency and a high-frequency primary winding connected in series in the output circuit of a first of said tubes, a low-frequency and a high-frequency secondary winding connected in series in the input circuit of a second of said tubes, both of said low-frequency windings being coupled together and both of said high-frequency windings being coupled together, and a switch connected across only said low-frequency secondary winding to short-circuit the inductance thereof and thereby to materially reduce the inductance of the low-frequency primary winding coupled to said low-frequency secondary winding.

10. A tuned radio-frequency coupling system connected between successive vacuum tubes in a radio-frequency amplifier adapted to operate over a high-frequency band and over a low-frequency band, each of said tubes having input and output circuits, including a cathode, said bands being separated by an intermediate-frequency band, said system comprising a transformer having tunable high-frequency and low-frequency secondary windings connected in series in the input circuit of the second of said vacuum tubes, said transformer having a certain primary winding connected in the output circuit of the first of said vacuum tubes and coupled to said low-frequency secondary winding, said first vacuum tube having undesirable capacitive coupling between its input and output circuits, means for neutralizing said capacitive coupling including at least one neutralizing winding coupled to said certain primary winding and to said low-frequency secondary winding and connected in series with a neutralizing condenser between the grid of said first vacuum tube and the cathode system, and a single-pole switch operable to short-circuit the inductance of said low-frequency secondary winding and thereby to effectively reduce the inductance of said neutralizing winding and of said primary winding coupled thereto.

11. In a radio-frequency amplifier, a radio-frequency coupling system adapted to operate over a high-frequency band and over a low-frequency band, said system including a set of high-frequency windings and a set of low-frequency windings, and a single-pole switch for effectively connecting one of said sets of windings in and out of operation, the arm of said switch being always maintained at a fixed base potential.

12. In a radio-frequency amplifier, a radio-frequency coupling system adapted to operate over a high-frequency band and over a low-frequency band, said system including a set of high-frequency windings and a set of low-frequency windings, and a switch connected across only one of said low-frequency windings for materially reducing the effective inductance of all of said low-frequency windings.

13. A radio-frequency coupling system adapted to operate over a high-frequency band and over a low-frequency band, said system including a low-frequency primary winding connected in series with a high-frequency primary winding, and a low-frequency secondary winding connected in series with a high-frequency secondary winding, said high-frequency windings and said low-frequency windings being respectively coupled together, and a single-pole switch connected to short-circuit said low-frequency secondary winding and thereby to reduce the inductance of said low-frequency primary winding.

14. A radio-frequency coupling system adapted to operate over a high-frequency band and over a low-frequency band, said system including a low-frequency primary winding connected in series with a high-frequency primary winding, and a low-frequency secondary winding connected in series with a high-frequency secondary winding, said low-frequency windings and said high-frequency windings being respectively coupled together, and a single-contact switch connected to short-circuit said low-frequency secondary winding and thereby to reduce the effective inductance of said low-frequency primary winding while said system is operating within said high-frequency band.

15. A radio-frequency coupling system adapted to operate over a high-frequency band and over a low-frequency band, said system including a low-frequency primary winding connected in series with a high-frequency primary winding, and a low-frequency secondary winding connected in series with a high-frequency secondary winding, said high-frequency windings and said low-frequency windings being respectively coupled together, and a switch having a single arm and a single contact connected across said low-frequency secondary winding to short-circuit the same and thereby to reduce the inductance of said low-frequency primary winding, the arm of said switch being maintained at ground potential.

16. A radio-frequency coupling system connected between successive vacuum tubes in a radio-frequency amplifier adapted to operate over a high-frequency band and over a low-frequency band, said system including a high-frequency and a low-frequency winding connected in series in the output circuit of one of said vacuum tubes, a high-frequency and a low-frequency secondary winding connected in series in the input circuit of the next succeeding vacuum tube, the high-frequency windings and low-frequency windings being respectively coupled together, and a single-pole single-contact switch operable to short-circuit the low-frequency secondary winding while said amplifier is operated within said high-frequency band.

17. A tuned radio-frequency coupling system connected between successive vacuum tubes in a radio-frequency amplifier adapted to operate over a high-frequency band and over a low-frequency band, said bands being separated by an intermediate-frequency band, said system including a high-frequency and a low-frequency primary winding connected in series in the output circuit of one of said vacuum tubes, a tunable high-frequency and low-frequency secondary winding connected in series in the input circuit of the next succeeding vacuum tube, the high-frequency windings and the low-frequency windings being respectively coupled together, and a single-pole switch operable to short-circuit the low-frequency secondary winding while said system is tuned within said high-frequency band.

18. A tuned radio-frequency coupling system connected between successive vacuum tubes in a radio-frequency amplifier adapted to operate over a high-frequency band and over a low-frequency band, a first vacuum tube of said amplifier having a cathode, anode and grid and having undesirable capacitive coupling between its input and output circuits, said system comprising a high-frequency and a low-frequency primary winding connected in series in the output circuit of said first vacuum tube, a high-frequency and low-frequency secondary winding, said secondary winding being tunable, connected in series in the input circuit of the next succeeding tube, a high-frequency and a low-frequency neutralizing winding connected in series with a neutralizing capacity between the grid of said first tube and its filament system, all of said high-frequency windings being magnetically coupled together and all of said low-frequency windings being magnetically coupled together, and a single-pole switch operable to materially reduce the effective inductance of all of said low-frequency windings while said system is tuned within the high-frequency band.

19. A radio-frequency coupling system connected between successive vacuum tubes in a radio-frequency amplifier adapted to operate over a high-frequency band and over a low-frequency band, said bands being separated by an intermediate-frequency band, said system including a set of high-frequency windings and a set of low-frequency windings, and a single-pole switch for effectively short-circuiting said set of low-frequency windings while said system is operated within said high-frequency band.

20. A multistage radio-frequency coupling system adapted to operate over a high-frequency band and over a low-frequency band, said bands being separated by an intermediate-frequency band, each stage including a transformer having two series-connected secondary windings coupled to at least one primary winding, and a single-contact switch, the simultaneous closure of the switches in said stages being operative in each stage to materially change simultaneously the inductance of one of the secondary windings and of the primary winding coupled thereto.

21. In each stage of a multistage radio-frequency amplifier, a radio-frequency coupling system adapted to operate over a high-frequency band and over a low-frequency band, said system including a set of high-frequency windings and a set of low-frequency windings, means comprising in each stage a single-pole single-contact switch, said switch being the only switch in each stage, for effectively connecting one of said sets of windings in and out of operation, and means interconnecting said switches whereby they may be operated simultaneously.

22. A multistage radio-frequency amplifier adapted to operate over a high-frequency band and over a low-frequency band, said bands being separated by an intermediate-frequency band, each stage including a vacuum tube and a tuned radio-frequency coupling system, said system including at least one primary winding connected in the output circuit of the vacuum tube in the first of said stages, a pair of high-frequency and low-frequency secondary windings connected in series in the input circuit of the vacuum tube in the second of said stages, a variable condenser connected across said pair of secondary windings, the low-frequency secondary winding being coupled to at least one primary winding, a switch connected across only said low-frequency secondary winding to short-circuit the inductance thereof and thereby to materially reduce the effective inductance of the primary winding coupled to said low-frequency secondary winding, and means interconnecting the several switches whereby they may be operated simultaneously.

23. A tuned radio-frequency coupling system connected between successive vacuum tubes in a radio-frequency amplifier each of said tubes having an anode, cathode and grid, said amplifier being adapted to operate over a high-frequency band and over a low-frequency band, said bands being separated by an intermediate-frequency band, said system comprising a transformer having high-frequency and low-frequency secondary windings connected in series in the input circuit of the second of said vacuum tubes, said secondary windings being tunable by a variable condenser, said transformer having a certain primary winding connected in the output circuit of the first of said vacuum tubes and coupled to said low-frequency secondary winding, said first vacuum tube having undesirable capacitive coupling between its input and output circuits, means for neutralizing said capacitive coupling including at least one neutralizing winding coupled to said certain primary winding and to said low-frequency secondary winding and connected in series with a neutralizing condenser between the grid of said first vacuum tube and the cathode system, a variable condenser connected in the input circuit of the first of said vacuum tubes for tuning the same, uni-control means interconnecting said variable condensers for tuning said amplifier, and a single-pole switch operable to short-circuit the inductance of said low-frequency secondary winding and thereby to effectively reduce the inductance of said neutralizing winding and of said primary winding coupled thereto.

24. A radio-frequency vacuum tube amplifier, each of said tubes having an anode, cathode and grid, said amplifier being adapted to operate over a high-frequency band and over a low-frequency band, said bands being separated by an intermediate-frequency band, said amplifier including a tuned radio-frequency coupling system connected between adjacent tubes, said system comprising a transformer having high-frequency and low-frequency secondary windings connected in series in the input circuit of the second of said vacuum tubes, a variable condenser connected across the secondary windings of said second vacuum tube, said transformer having a certain primary winding connected in the output circuit of the first of said vacuum tubes and coupled to said low-frequency secondary winding, high-frequency and low-frequency secondary windings shunted by a variable condenser and connected in series in the input circuit of said first vacuum tube, a primary winding coupled to said last-mentioned low-frequency secondary winding, said first vacuum tube having undesirable capacitive coupling between its input and output circuits, means for neutralizing said capacitive coupling including at least one neutralizing winding coupled to said certain primary winding and to said first-mentioned low-frequency secondary winding and connected in series with a neutralizing condenser between the grid of said first vacuum tube and the cathode system, uni-control means for interconnecting said variable condensers whereby the respective input circuits may be simultaneously tuned, a single-pole switch connected across each of said low-frequency secondary windings to short-circuit the inductance thereof and thereby to effectively reduce the inductance of said primary windings respectively coupled thereto, and means interconnecting said switches whereby they may be operated simultaneously.

25. A radio-frequency coupling system adapted to operate over a high-frequency band and over a low-frequency band, said bands being separated by an intermediate-frequency band, said system including a high-frequency primary winding connected in series with a low-frequency primary winding, and a high-frequency secondary winding connected in series with a low-frequency secondary winding, said high-frequency windings and said low-frequency windings being respectively coupled together, said low-frequency primary winding being effectively shunted by a capacity whereby it is resonant at a frequency within said intermediate-frequency band, and a single-contact switch connected to short-circuit said low-frequency secondary winding and thereby to reduce the effective inductance of said low-frequency primary winding while said system is operating within said high-frequency band.

26. A tuned radio-frequency coupling system adapted to operate over a high-frequency band and over a low-frequency band, said bands being separated by an intermediate-frequency band, said system including a high-frequency primary winding connected in series with a low-frequency primary winding, and a high-frequency secondary winding connected in series with a low-frequency secondary winding, said high-frequency windings and said low-frequency windings being respectively coupled together, means for variably tuning said secondary windings over said high-frequency band and over said low-frequency band, said low-frequency primary winding being effectively shunted by a capacity making said low-frequency primary winding resonant at a frequency within said intermediate-frequency band, whereby more nearly uniform amplification is attained over the high-frequency band, and a single-contact switch connected to short-circuit at least a portion of said low-frequency secondary winding and thereby to reduce the effective inductance of said low-frequency primary winding while said system is tuned within said high-frequency band.

27. In a radio receiving system, an antenna circuit, a tuned radio-frequency amplifier including a plurality of vacuum tubes coupled by a tuned radio-frequency coupling system, said coupling system being adapted to operate over a high-frequency band and over a low-frequency band, said bands being separated by an intermediate-frequency band, said system including a high-frequency primary winding and a low-frequency primary winding connected in series in the output circuit of the first of said tubes, a high-frequency secondary winding and a low-frequency secondary winding connected in series in the input circuit of a second of said tubes, said high-frequency windings being magnetically coupled together and said low-frequency windings being magnetically coupled together, a variable tuning condenser connected across said secondary windings, and a single-contact switch connected across said low-frequency secondary winding to short circuit the same, the first of said vacuum tubes being coupled to said antenna circuit by a tuned coupling system including a primary winding connected in said antenna circuit and loosely coupled to a high-frequency secondary winding, said last-mentioned high-frequency secondary winding being connected in series with a low-frequency secondary winding in the input circuit of said first vacuum tube, the inductance of said last-mentioned primary winding and the capacity of the antenna together being resonant at a frequency within said intermediate frequency band, a variable tuning condenser connected across said last-mentioned secondary windings, and a single-contact switch connected across said last-mentioned low-frequency secondary winding to short-circuit the same, uni-control means interconnecting said variable condensers whereby the input circuits of said tubes may be simultaneously tuned, and means mechanically interconnecting said switches whereby the inductances of said low-frequency secondary windings may be simultaneously short-circuited thereby to reduce simultaneously the effective inductances of the primary windings respectively coupled thereto.

28. A tuned radio-frequency coupling system connected between successive vacuum tubes in a radio-frequency amplifier, said tubes having input and output circuits including a grid, cathode and anode, said amplifier being adapted to operate over a high-frequency band and over a low-frequency band, a first vacuum tube of said amplifier having undesirable capacitive coupling between its input and output circuits, said system comprising a pair of high-frequency and low-frequency primary windings connected in series in the output circuit of said first vacuum tube, a pair of tunable high-frequency and low-frequency secondary windings connected in series in the input circuit of the next succeeding vacuum tube, a pair of high-frequency and low-frequency neutralizing windings connected in series with a neutralizing capacity between the grid of said first tube and the cathode system, all of said high-frequency windings being magnetically coupled together and all of said low-frequency windings being magnetically coupled together, and a switch having a contact connected to one end of said low-frequency secondary winding and an arm connected to the cathode system for effectively short-circuiting at least a portion of the inductance of all of said low-frequency windings while said system is tuned within the high-frequency band.

29. A tuned radio frequency coupling system adapted to operate over a plurality of frequency bands, said system including at least one primary winding and a plurality of secondary windings, means for tuning said secondary windings, capacity shunting said primary winding and of such value that the combination of said capacity and said primary winding is capacitively reactive to the highest of said frequency bands, and means to short circuit at least one of the secondary windings whereby the frequency range over which said tuning means tunes said secondary windings is changed from a lower to a higher of said frequency bands.

30. A radio frequency coupling system according to claim 29 wherein there exists at least dual coupling between said primary and secondary windings.

31. A radio coupling system according to claim 29 wherein said short circuiting means comprises a switch having a single arm and a single contact, said arm being maintained at ground potential and being arranged to effectively short circuit at least one of said secondary windings.

32. In combination in a radio frequency amplifier, a pair of vacuum tubes and a coupling system in accordance with claim 29, said coupling system being connected between two of said tubes, said primary winding being connected in the output circuit of a first of said tubes and said secondary windings being connected in the input circuit of a second of said tubes.

33. In a radio frequency amplifier, a plurality of amplifying vacuum tubes, said tubes being coupled by a coupling system in accordance with claim 29, and uni-control means for simultaneously operating the short circuiting means of all the coupling systems.

34. A tuned radio frequency coupling system adapted to operate over two frequency bands, said system including a primary winding and a plurality of secondary windings coupled thereto, a capacity shunting said primary winding and of such value that the circuit consisting of said capacity and said primary winding is capacitively reactive over the higher of said frequency bands, and inductively reactive over the lower of said frequency bands, a variable capacity for tuning said secondary windings, and a second coupling between said primary and secondary windings, whereby the transmission over said higher frequency band is substantially uniform as said variable capacity is varied.

35. A radio frequency coupling system according to claim 34 in which there is included another primary winding in series with said first primary winding, said other primary winding being resonant at a frequency lower than the lower of said frequency bands, whereby substantially uniform amplification is obtained over both said frequency bands.

36. A tuned radio frequency coupling system adapted to operate over two frequency bands, said system including input and output circuits, said input circuit including at least one inductance and said output circuit including a plurality of inductances, means for tuning said output circuit, capacity shunting said input inductance and of such value that the combination of said capacity and said inductance is capacitively reactive to the higher of said frequency bands, and means to short circuit at least one of the windings of the output circuit, whereby the frequency range over which said tuning means tunes said output circuit is changed from the lower to the higher of said frequency bands.

37. A radio coupling system according to claim 36, wherein said short-circuiting means comprises a switch having a single arm and a single contact, said arm being maintained at ground potential and being arranged to effectively short circuit at least one of said windings of the output circuit.

38. In a radio frequency amplifier, a plurality of amplifying vacuum tubes, said tubes being coupled by a coupling system in accordance with claim 36, and uni-control means for simultaneously operating the short-circuiting means of all of the coupling systems.

39. A tuned radio frequency coupling system adapted to operate over a plurality of frequency bands, said system including at least one primary winding and a plurality of secondary windings, means for tuning said secondary windings, capacity shunting said primary winding and of such value that the combination of said capacity and said primary winding is capacitively reactive to the highest of said frequency bands, and means to short circuit at least one of the secondary windings, whereby the frequency range over which said tuning means tunes said secondary windings is changed from a lower to a higher of said frequency bands.

40. A radio frequency coupling system according to claim 39, wherein there exists at least dual coupling between said primary and secondary windings.

41. A radio coupling system in accordance with claim 39, wherein said short-circuiting means comprises a switch having a single arm, said arm being maintained at ground potential and being arranged to selectively short circuit said secondary windings.

42. In a radio frequency amplifier, a plurality of amplifying vacuum tubes, said tubes being coupled by a coupling system in accordance with claim 39, and uni-control means for simultaneously operating the short-circuiting means of all of said coupling systems.

In testimony whereof I affix my signature.

WILLIAM A. MacDONALD.